United States Patent

[11] 3,631,296

[72] Inventor Homah C. Collie, Jr.
Long Grove, Ill.

[21] Appl. No. 883,765

[22] Filed Dec. 10, 1969

[45] Patented Dec. 28, 1971

[73] Assignee Motorola, Inc.
Franklin Park, Ill.

[54] TELEVISION DEFLECTION SYSTEM
9 Claims, 5 Drawing Figs.

[52] U.S. Cl. .......... 315/13, 315/27

[51] Int. Cl. .......... H01j 29/50

[50] Field of Search .......... 315/13, 31 TV, 27, 27 SR, 27 XY, 27 GD

[56] References Cited

UNITED STATES PATENTS 3,504,211 3/1970 Takemoto et al. .......... 315/31

3,346,765 10/1967 Barkow .......... 315/27

3,440,483 4/1969 Kaashoric et al. .......... 315/27

*Primary Examiner*—Rodney D. Bennett, Jr.
*Assistant Examiner*—N. Moskowitz
*Attorney*—Mueller and Aichele

ABSTRACT: A deflection system for use with a color television multibeam cathode-ray tube utilizes a toroid deflection yoke with the distribution of the vertical and horizontal deflection windings being such as to provide a uniform deflection field within the toroid. An additional set of four series-connected, oppositely wound, correction windings are wound on different quadrants of the toroid yoke, and a correction current is applied to the correction windings in the form of a current corresponding to the horizontal deflection signal modulated by the vertical deflection signal for correcting misconvergence of the beams.

PATENTED DEC 28 1971 3,631,296

INVENTOR.
HOMAH C. COLLIE, JR.

BY Mueller, Aichele & Rauner

ATTORNEYS.

INVENTOR
HOMAH C. COLLIE, JR.
BY *Mueller, Aichele & Rauner*
ATTORNEYS

TELEVISION DEFLECTION SYSTEM

BACKGROUND OF THE INVENTION

In a color television system using a three-beam shadow mask cathode-ray tube, it is desirable to provide a uniform field or anastigmatic deflection yoke to reduce beam distortion and beam landing problems. By utilizing a toroid yoke and by winding the horizontal and vertical deflection windings on the yoke in a basic sine or cosine distribution, it is possible to obtain a substantially uniform deflection field within the opening of the yoke. The use of an anastigmatic yoke of this type makes it possible to converge the three beams along the vertical and horizontal axes of he picture tube face or the shadow mask; but the corners of the raster are not converged, because the three beams pass through the toroid at different locations and, therefore, are subjected to different deflection fields.

With the conventional saddle yoke predeflection convergence system, static and dynamic convergence of the beams is effected at a point in the path of travel of the beams prior to the point at which the beams are subjected to the deflection fields. This results in shifts of the beam landings, so that it has been necessary to provide a relatively wide guard band on the shadow mask of the tube in order to maintain the desired purity of the reproduced color images. In addition, a substantial blue beam landing error results from the use of such predeflection convergence correction of blue "droop."

It is desirable to provide for the convergence correction at the center point of the beam deflection in order to eliminate this problem of a shift in the beam landings caused by conventional convergence assemblies. A technique which has been employed to accomplish this is to modify the deflection currents passing through the deflection windings by superimposing correction currents on the deflection windings in opposite senses in the two coil halves of the deflection coil system, with the additional correction currents being a product of the instantaneous values of the usual vertical and horizontal deflection currents. A relatively complex driving circuit is required for deriving such correction currents, and it is necessary to modulate the entire sweep current through the deflecting coils, resulting in a requirement for a substantial amount of power in order to provide the correction current. Another disadvantage of this technique is that the turns location for such correction is fixed by the location of the deflection windings, and the number of turns and size of the wires in the deflection windings is fixed; so that the correction currents produced are dependent on the configuration and characteristics of the deflection windings themselves.

SUMMARY OF THE INVENTION

Accordingly it is an object of this invention to provide an improved dynamic convergence system for use in a color television receiver.

It is another object of this invention to provide a deflection correction field coinciding with the deflection center of the beam in a cathode-ray tube.

It is an additional object of this invention to provide dynamic convergence correction with a toroid deflection yokes producing a uniform deflection field by winding additional convergence correction coils on the yoke and applying a correction signal which is derived from the horizontal deflection signal modulated by the vertical deflection signal to produce a convergence correction field having a center at the deflection center of the yoke.

In accordance with a preferred embodiment of this invention, a deflection yoke for a cathode-ray tube has a pair of deflection coil systems one of which deflects an electron beam in one direction and the other of which deflects the electron beam in an orthogonal direction in response to first and second deflection signals, respectively. A deflection correction system includes a magnetic correction field producing means located to produce a correction field centered substantially at the center of the deflection fields produced by the deflection coil system. A control means is provided for varying the correction field as a function of the instantaneous values of the first and second deflection signals, with the correction filed being produced in addition to the deflection fields obtained from the deflection coil systems.

DETAILED DESCRIPTION

Figure 1:
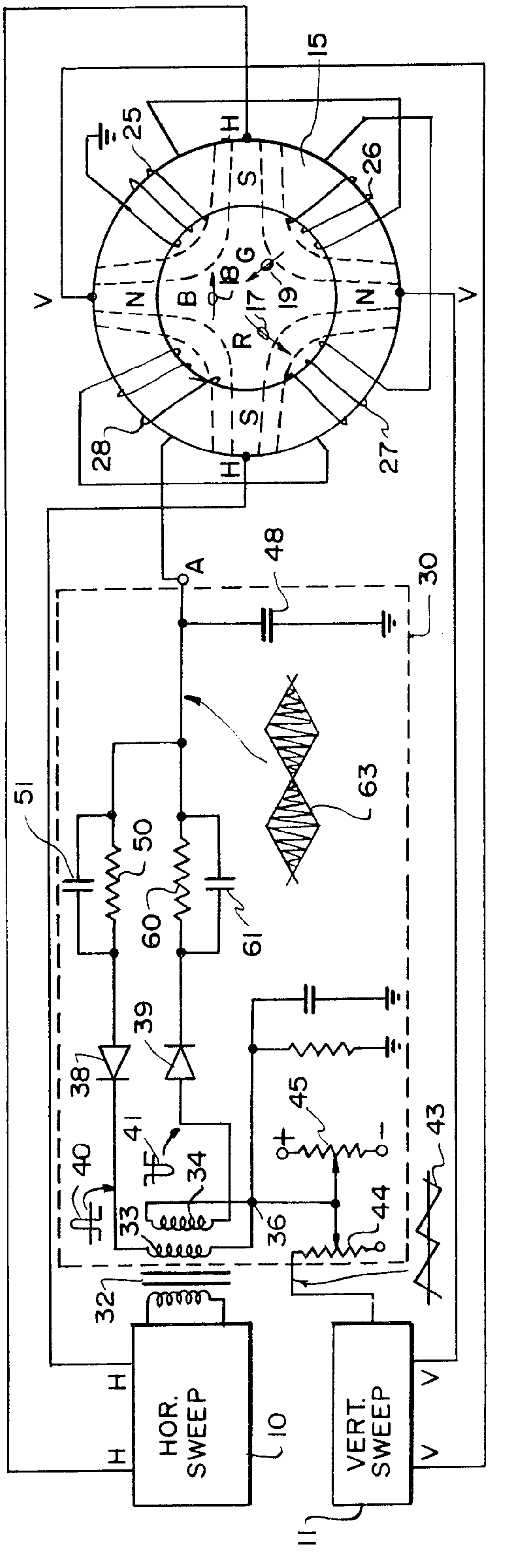
FIG. 1 is a schematic diagram of a correction circuit in accordance with a preferred embodiment of this invention.
Figure 5:
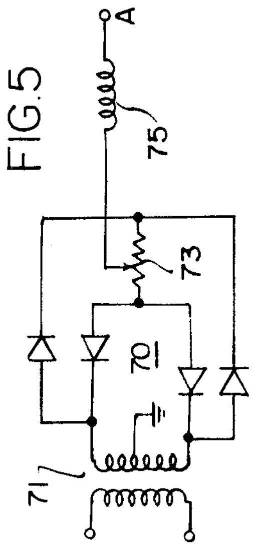
FIG. 5 shows details of a circuit which may be added to the circuit shown in FIG. 1.

Referring now to FIG. 1, there is shown a schematic diagram of a portion of the deflection system of a color television receiver employing a horizontal sweep circuit 10 and a vertical sweep circuit 11 for producing the horizontal and vertical sweep signals, respectively. The output of the horizontal sweep circuit 10 is applied to horizontal deflection windings (not shown) on a toroidal deflection yoke 15 and the output of the vertical sweep system is applied to vertical sweep windings (not shown) also wound on the toroid yoke 15. The distribution of the turns of the horizontal and vertical windings on the core 15 is such as to provide a substantially uniform flux distribution within the toroid opening or center and may be derived from a sinusoidal or cosine distribution of the turns of the windings as suggested in the patents to K. Schlesinger, No. 2,562,395 issued July 31, 1951, and No. 2,881,341 issued Apr. 7, 1959. The annular opening in the center of the toroid yoke 15 is of sufficient internal diameter to accommodate the neck of a conventional, shadow-mask, color cathode-ray tube having three electron guns producing three electron beams 17, 18, and 19 in an equilateral triangle configuration. The beams 17, 18 and 19 are indicated in FIG. 1 as representative of the red, blue, and green fundamental colors, respectively, for exciting corresponding red, blue, and green triads on the display screen of the shadow mask cathode-ray tube.

Figure 2:
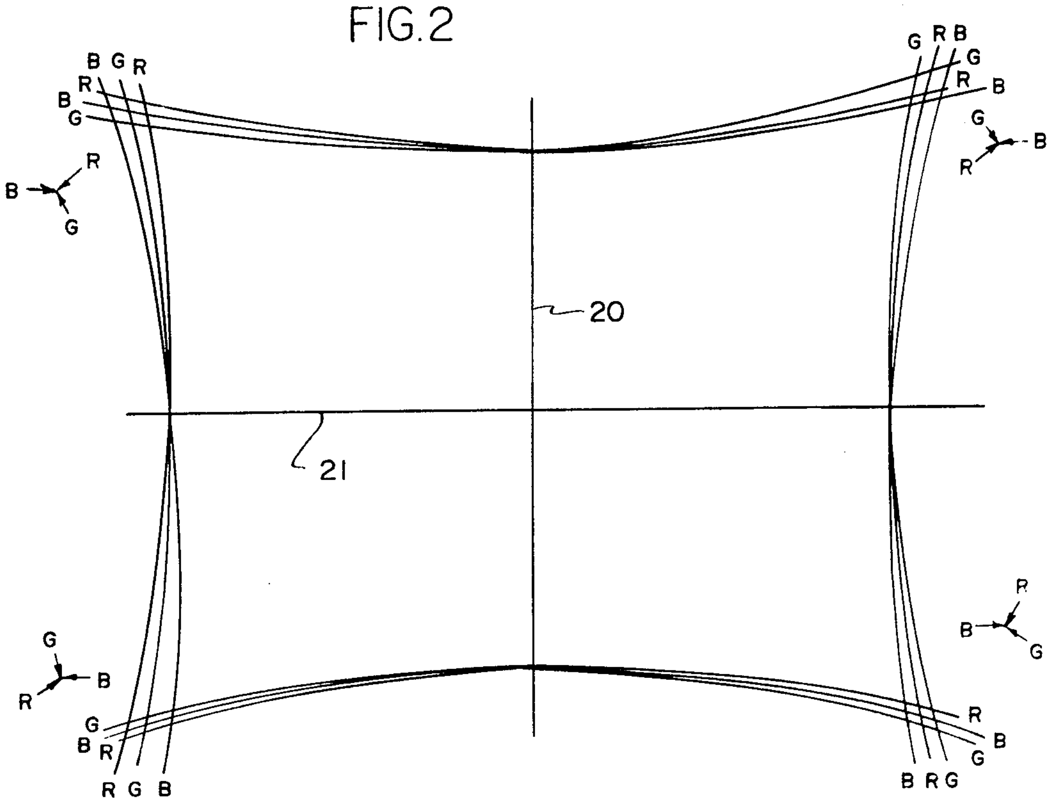
FIG. 2 illustrates the convergence errors to be corrected by the circuit illustrated in FIG. 1.

By providing the turns distribution of the horizontal and vertical deflection windings in a cosine distribution, a uniform deflection field is produced within the area of the tube traversed by the beams 17, 18, and 19; so that satisfactory convergence of the three beams by their superimposition at the shadow mask is obtained along vertical and horizontal deflection axes 20 and 21 (see FIG. 2), providing for the desired color convergence or coincidence using the anastigmatic deflection yoke assembly 15 shown in FIG. 1. As shown in FIG. 2, which represents the display screen of the cathode-ray tube, the corners of the raster produced by the anastigmatic deflection yoke 15 shown in FIG. 1 are not properly converged because the locus of the beam coincidence is a sphere with a radius equal to the distance from the yoke to the raster center. The amount of misconvergence is indicated by the curved lines of FIG. 2; and at each corner of the convergence display indicated in FIG. 2, there is shown a small vector diagram labeled with the appropriate color designation R, G, or B, for red, green, and blue, which indicates the correction necessary to order to cause proper convergence of the raster at the corners. The misconvergence horizontally and vertically is greatest at the corners and decreases as the cross point of the axes 20 and 21 is reached.

From an examination of FIG. 2, it can be seen that the correction required to properly converge the three electron beams varies from a maximum in a given direction for a given beam down to a minimum and then increases in the opposite direction from a minimum to a maximum as the center line 20 is crossed for the left to right or horizontal convergence or as the center line 21 is crossed for the top to bottom or vertical convergence. For example, the correction vector for the blue beam 18 required to properly converge the blue beam in the upper left corner of the raster is substantially a horizontal vector extending from left to right, that is, the blue beam convergence point must be moved directly to the right to converge it with the other beams in the corner, with the corresponding convergence vectors for the red and green beams 17 and 19 are being indicated. The amplitude of this is approached, with no change (no amplitude) being required on the axis 20. To the right of the axis 20, the blue beam must be moved in the opposite direction, or to the left, as indicated by the small vector diagram in the upper right corner of FIG. 2, and must be moved in increasing amounts from the axis 20 to the far upper right corner of the raster indicated in FIG. 2.

A similar 180° phase shift of the required correction field for obtaining the necessary convergence also is obtained in the vertical direction as the horizontal axis 21 is crossed, and this may be ascertained from the vector diagrams shown at the corners of the raster in FIG. 2. Also corresponding corrections for the red and green beams must be effected in similar manner.

In order to obtain this dynamic convergence correction with the uniform field yoke 15, shown in FIG. 1, four dynamic convergence correction windings 25, 26, 27, and 28 are wound, one in each quadrant of the yoke 15 and are connected in series between ground and a point A, which in turn is connected to the output of a convergence correction signal-producing circuit 30, enclosed in the dotted lines in FIG. 1. The series connected coils 25, 26, 27, and 28 are alternately wound in opposite directions to effectively operate as four magnets, with the poles of the magnets indicated as in FIG. 1 as including two North poles vertically oriented, and two South poles horizontally oriented between the adjacent turns of the oppositely wound correction windings.

The magnetic poles shown in the drawing of FIG. 1 are caused by a predetermined current, the direction and magnitude of which is chosen to cause a correction field to be applied to the three beams 17, 18, and 19, to move the beams in the directions of the vector arrows indicated in FIG. 1, with these vector arrows also being the same as those shown as necessary for effecting convergence correction at the upper left-hand corner of the raster shown in FIG. 2. The magnitude of the current flowing through the windings 25 to 28 determines the amount of movement in the directions shown, whereas the direction of the current determines the direction of the vectors.

The orientation of the windings 25 to 28 is such with respect to the beams 17, 18, and 19 as to cause the relative movements of the beams as indicated in FIG. 1. Since the windings 25 to 28 are wound over the deflecting coils, the center of the convergence correction field produced by the windings 25 to 28 is superimposed on or coincides with the deflection center for the beams caused by the signals applied to the vertical and horizontal deflection windings. Since the turns of the deflection windings are cosine distributed on the yoke 15 to provide a uniform field in the yoke 15, the beam landings of the three beams 17, 18, and 19 are not shifted by the correction convergence field obtained as a result of the current flowing through the windings 25, 26, 27, and 28.

To effect the correction necessary for the upper right-hand quadrant of the raster shown in FIG. 2, it is necessary to reverse the polarity of the current flowing through the windings 25 to 28, which in turn reverses the magnetic poles indicated in FIG. 1, so that the North poles are the two horizontal poles and the South poles are the two vertical poles. The vector movements of the beams 17, 18, and 19 then would be diametrically opposed to that which is indicated in FIG. 1.

Figure 3:
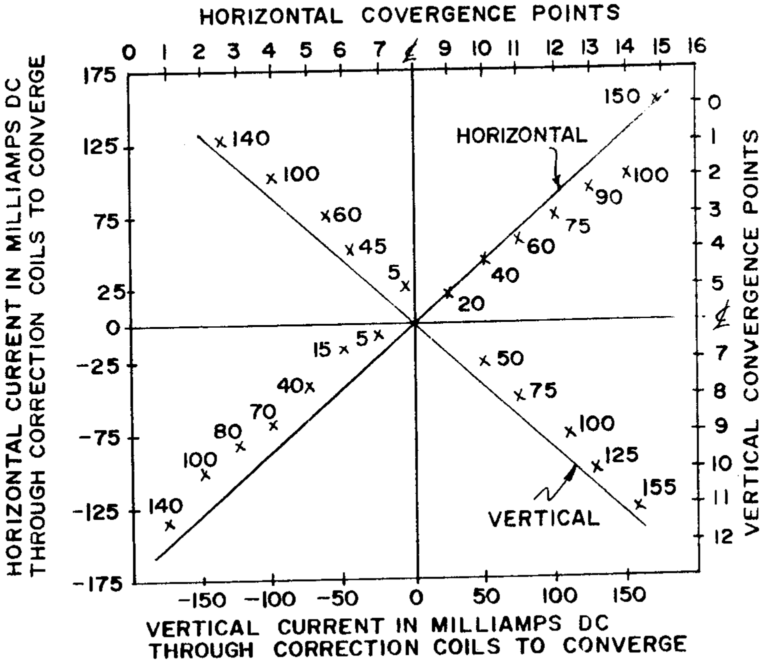
FIG. 3 is a plot of the currents used in the circuit of FIG. 1 in order to correct the errors illustrated in FIG. 2.

For each point on the raster, the direction and magnitude of the current through the coils 25, 26, 27, and 28 can be determined in order to obtain the convergence of the electron beams 17, 18, and 19. For a particular yoke in which the coils 25, 26, 27, and 28 each were 20 turns of No. 25 wire, the plotted currents relative to ground and the magnitudes of these currents for convergence of the beams at all points, using a deflection yoke constructed in accordance with the embodiment shown in FIG. 1, are shown in FIG. 3. The straight, substantially diagonal lines in FIG. 3 indicate the averaged sawtooth correction current which must be applied to the windings 25 to 28 at point A from the output of the correction circuit 30 in FIG. 1.

Figure 4:
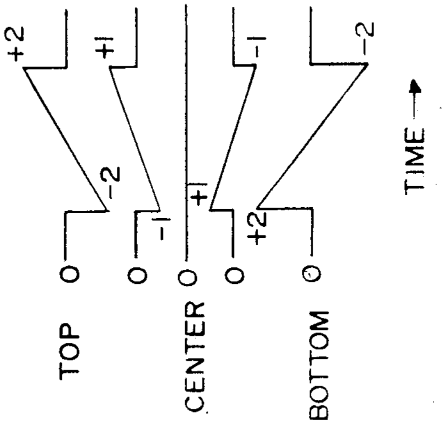
FIG. 4 shows wave forms illustrating the operation of the circuit shown in FIG. 1.

To obtain the dynamically varying convergences correction currents at point A, it can be seen from an examination of FIG. 2, that the necessary currents required are directly related to the vertical and horizontal scanning signals, being in the form of horizontal sawtooth pulses varying in amplitude at a vertical rate. In FIG. 4 the required basic convergence correction current waveform is illustrated for five relative points of the raster, varying from the top to the bottom, with each of the sawtooth waveform configurations shown in FIG. 4 corresponding to one horizontal scanning cycle. In FIG. 4, it should be noted, that each cycle of the correction current waveforms must change polarity substantially at the midpoint in time which corresponds to the point at which the horizontal scanning of the beams 17, 18, and 19 causes the beams to cross the vertical axis 20 of the raster shown in FIG. 2. The magnitude of the correction current is dependent upon the point in which the vertical scan to which the beams 17, 18, and 19 are subjected, being a maximum at the top and bottom of the raster and being O or a minimum at the horizontal axis 21 (FIG. 2) and also changing in polarity as the vertical scan crosses the axis 21.

Referring again to FIG. 1, and more particularly to the details of the correction current producing circuit 30, the horizontal sweep transformer 32, which also is utilized to provide sweep signals to the horizontal sweep windings H—H on the toroid deflection yoke 15, is provided with an additional pair of bifilar secondary windings 33 and 34, connected together at a common terminal 36 with the other ends of the windings 33 an 34 being coupled, respectively, to a pair of switching diodes 38 and 39. The polarity of the currents induced in the windings 33 and 34 is in the opposite sense, with the anode of the diode 39 being connected to the free end of the winding 34 with the cathode of the diode 38 being connected to the corresponding end of the winding 33. The polarity of the diodes 38 and 39 is chosen such that, during the trace intervals of the horizontal sweep signal produced in the primary winding of the transformer 32, both of the diodes 38 and 39 are rendered forward-conducting for the entire trace interval. During the retrace interval of the signal from the horizontal sweep circuit 10 a pair of opposite polarity pulses 40 and 41 are applied to the diodes 38 and 39, respectively, to render both of the diodes 38 and 39 nonconductive. Thus, the diodes 38 and 39 operate as a bidirectional switch between the terminal A and the common terminal 36, with operation of the switch being at the horizontal frequency.

The operating potential for operating the deflection correction windings 25 to 28 is supplied by a signal varying at the vertical scanning rate and which may be obtained from the R/G vertical tilt winding of the vertical output transformer in the vertical sweep circuit 11. This vertical sawtooth signals 43 is applied through a potentiometer 44 to the terminal 36 to modulate the horizontal signals applied to the secondary windings 33 and 34. Since the rate at which the vertical scan varies is considerably less than the horizontal scanning frequency (60 Hz. as compared with 15,750 Hz. horizontal frequency), for any given horizontal trace or scan cycle the vertical signal appears to be substantially a constant DC signal or source of potential. The value of this DC potential is dependent upon the particular portion of the vertical sawtooth scan from which it is derived and establishes the amplitude and polarity of the horizontal scanning current applied through the bidirectional switch circuit to the terminal A.

The AC centerline of the vertical waveform 43 may be adjusted by a potentiometer 45 having the ends connected, respectively, to a source of positive and negative DC biasing potential. The movable tap of the potentiometer 45 is connected in common with the tap of the potentiometer 44 to the terminal 36. When the tap on the potentiometer 45 is connected to its midpoint the vertical sawtooth waveform 43 is symmetrical with respect to ground, which is shown as the center line of the waveform 43 in FIG. 1. Thus, at the beginning of the vertical scan corresponding to the top of the raster shown in FIG. 2, the vertical signal 43 is at a maximum positive potential relative to ground.

The correction coils 25, 26, 27, and 28 form a resonant circuit along with a capacitor 48, which, in the operation of the circuit shown in FIG. 1, is chosen to have a resonant frequency such that one-half cycle of the resonant frequency occurs during the time interval of the retrace pulses 40, 41 which are applied to the diodes 38 and 39 to render them nonconductive. This causes the desired reversal of the magnetic field during the retrace interval to initiate the next trace cycle with a current polarity opposite to the polarity of the current at the end of the horizontal trace or scan cycle. The starting and finishing current polarities depend upon the polarity of the modulating vertical sweep signal 43 applied to the terminal 26 for each given horizontal cycle. The diodes 38 and 39 merely operate as a bidirectional switch to permit flow through the terminals 36 and A and the windings 25 to 28 in both directions in the same manner as the operation of a conventional horizontal deflection system. The power supply, however, changes both as to magnitude and polarity in accordance with the vertical sweep signal, so that the correction current appears substantially as a horizontal sweep signal modulated by the vertical sweep signal as indicated by the waveform 63.

Ideally, since the diodes 38 and 39 merely act as a bidirectional switch, it would be desirable to have the anode of the diode 38 and the cathode of the diode 39 connected directly to the terminal A. In a practical application, however, the circulating current introduced through the diodes 38 and 39 by the bifilar windings 33 and 34 during the horizontal trace or scanning intervals is produced by a voltage, which, in the absence of any additional impedance in this circuit, is sufficient to cause a high enough current to burn out the diodes 38 and 39. As a consequence, it is necessary to provide in series with the diodes 38 and 39 a pair of current limiting resistors 50 and 60 to keep the circulating "switch closing" current from overheating and destroying the diodes. A pair of capacitors 51 and 61 are connected across the resistors 50 and 60, respectively, to develop a DC countervoltage while providing an AC signal bypass for the proper operation of the resonant circuit consisting of the coils 25 to 28 and the capacitor 48.

As the vertical sweep voltage 43 approaches the AC centerline as indicated in FIG. 4, the envelope modulating the horizontal signals becomes decreasing in amplitude as indicated by the waveform 63 applied to terminal A. This also is indicated in FIG. 4, with the modulating signal 43 obtained from the output of the vertical sweep circuit 11 at the center of the raster corresponding to the axis 21 being O; so that substantially no current flows in either direction through the windings 25 to 28 for the horizontal deflection circuit scan along the axis 21. As the vertical scan continues, the polarity of the signal 43 reverses with respect to ground; so that the polarity of the horizontal waveform applied to the windings 25 to 28 also is reversed for the bottom half of the picture, with the magnitude of the modulating correction current envelope increasing to a maximum for the bottommost horizontal scan in the raster. As a consequence, the electron beams 17, 18, and 19 are subjected to a continually varying amplitude of a convergence correction field, and the direction of this field changes for each of the four quadrants of the raster provided by the axes 20 and 21 shown in FIG. 2.

In addition to the convergence correction which has been described thus far, a positive or negative DC biasing voltage may be injected at the terminal 36 by changing the tap on the potentiometer 45 in order to change the amount of convergence correction at the top of the raster with respect to the bottom. This, in effect, moves the center line 21 (FIG. 2) vertically in accordance with the polarity of he correction voltage which is added at the terminal 36, and in effect moves the AC centerline of the waveform 43 to accomplish this result. The amount of convergence correction at the left side of the raster with respect to the right side may be adjusted by adding a DC biasing potential at the terminal A, thereby in effect, changing the slope of the waveforms shown in FIG. 4 to effect a greater or lesser convergence of the left side of the raster shown in FIG. 2 with respect to the right side thereof. A circuit which may be utilized to provide this shift is shown in FIG. 6 in the form of a full-wave rectifier 70 connected to a suitable AC source through a transformer 71 (such as the vertical output transformer) to produce a DC voltage across a potentiometer 73. The DC correction voltage may be varied from a positive to a negative amount by moving the tap on the potentiometer 73, with this varying DC voltage being applied through a coupling coil 75 to the terminal A in order to unbalance the correction currents and the location of the axis 20 (FIG. 2) is such an adjustment is considered necessary.

By the use of the circuit described above, correction of beam convergence is accomplished by the correction coils 25 to 28 without affecting the beam landings. Since the uniform field yoke 15 gives beam landings consistent with correction capabilities of lens designs, and the convergence correction coils cause no shift in the beam landings as do conventional convergence assemblies, purity guard band possibilities are substantially improved, and result in more tolerance for adjustment in production, or permit an increased brightness of the cathode-ray tube because the shadow mask apertures can be made larger. In addition, the problem of the blue droop correction which occurs with the conventional saddle yoke predeflection convergence techniques is substantially reduced, with a blue droop only about half that associated with most current saddle yokes being observes utilizing the techniques described above and illustrated in FIG. 1.

It also has been observed that pin cushion distortion is reduced by the convergence action, and the use of separate correction coils on the yoke independent of the deflecting coils permits complete flexibility in the number of turns, wire size, and relative location of the convergence correction coils to match any circuitry or signal waveforms which are desired, and also permits shifting the turns location to obtain any desired field shaping. In addition, it should be noted that although the correction system has been described in conjunction with a uniform field yoke, the correction system also could be used with yokes having other than a uniform field. Similarly, the correction system could be used to converge the rasters of "in-line" gun cathode-ray tubes.

I claim:

1. For use in conjunction with the deflection yoke for a cathode-ray tube having a pair of deflection coil systems, one of which produces a deflection field which deflects an electron beam in one direction, and the other of which produces a deflection field which deflects the electron beam in a direction orthogonal to said one direction in response to first and second deflection signals, respectively, a correction system including in combination:

magnetic correction field producing means located to produce a correction field centered substantially at the center of the deflection fields produced by said deflection coil systems;

control means coupled to the correction field producing means and responsive to said first and second deflection signals for varying the magnetic correction field as a function of the instantaneous values of said first and second deflection signals, the correction field being produced in addition to the deflection fields of the deflection coil systems.

2. The combination according to claim 1 wherein the magnetic correction field producing means includes additional correction coils wound on said deflection yoke and wherein the control means produces a single varying correction current flowing through the correction coils.

3. The combination according to claim 2 wherein the correction current is in the form of a current corresponding to the first deflection signal modulated by the second deflection signal.

4. The combination according to claim 2 wherein the deflection yoke is a uniform-field deflection yoke subject to producing display errors on the screen of a cathode-ray tube with which it is used.

5. In a deflection system for a cathode-ray tube of the multiple beam type used in a color television receiver, a uniform-field toroid deflection yoke having a pair of deflection coil systems including first and second deflection coils wound on said deflection yoke, with a winding distribution to produce a uniform deflection field, one of the deflection coil systems deflecting electron beams in the cathode-ray tube in one direction and the other deflection coil system deflecting the beams in the cathode-ray tube in a direction substantially orthogonal to said one direction in response to first and second deflection signals, respectively, a correction system including in combination:

additional correction winding means on said toroid deflection yoke for producing a correction field centered substantially at the center of the deflection fields produced by the deflection coil systems for correcting beam convergence errors produced by the deflection coil systems;

control means coupled to the correction winding means and responsive to the first and second deflection signals for supplying a single varying current to the correction winding means, said current varying as a function of the instantaneous values of said first and second deflection signals.

6. The combination according to claim 5 wherein the correction current is a current corresponding to the first deflection signal modulated by the second deflection signal.

7. The combination according to claim 6 wherein the one of the deflection coil systems is a horizontal deflection system and the other deflection coil system is a vertical deflection system, with the first deflection signal being a horizontal deflection signal and the second deflection signal being a vertical deflection signal.

8. The combination according to claim 6 wherein the toroid deflection yoke is for use with a cathode-ray tube of the three-beam type, with the electron beams arranged in an equilateral triangular configuration and with the first and second deflection coil systems including first and second deflection windings arranged on the toroid yoke in a manner to produce a uniform deflection field within the toroid.

9. The combination according to claim 8 wherein the correcting winding means includes four windings equally spaced on said toroid, the four windings being connected in series with adjacent windings being oppositely wound on the toroid.

* * * * *